:::

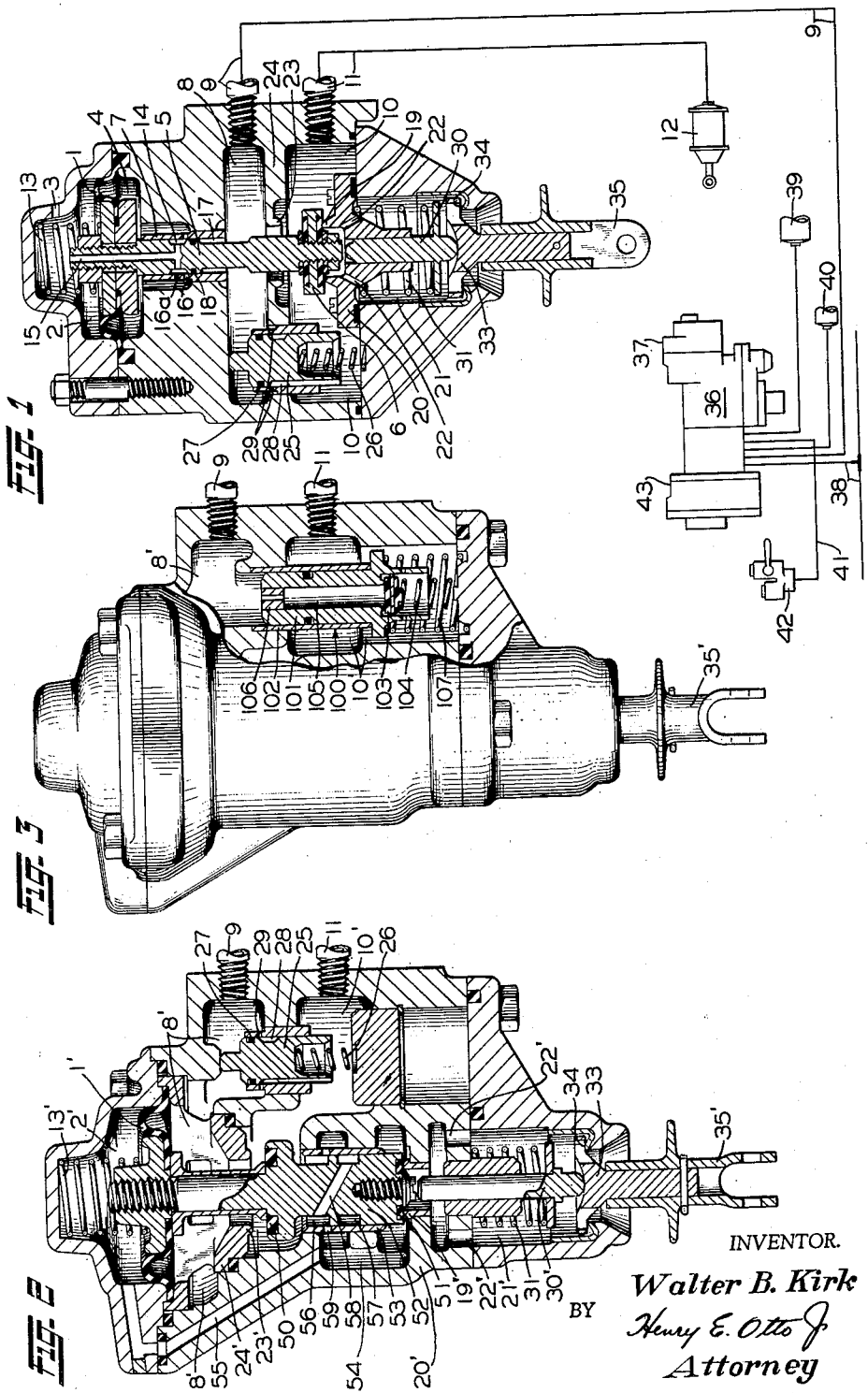

United States Patent Office 3,001,833
Patented Sept. 26, 1961

3,001,833
BRAKE CYLINDER RELEASE VALVE DEVICE
Walter B. Kirk, Pitcairn, Pa., assignor to Westinghouse Air Brake Company, Wilmerding, Pa., a corporation of Pennsylvania
Filed Dec. 22, 1959, Ser. No. 861,279
10 Claims. (Cl. 303—68)

This invention relates to brake cylinder release valve devices of the type used on railway cars to permit a brake cylinder on a railway car to be vented in bypass of a brake control pipe without depleting the pressure in a fluid pressure source which may then be connected to said control pipe by a brake controlling valve.

Brake cylinder release valve devices have heretofore been proposed comprising valve means effective in a normal position to connect a brake control pipe to a brake cylinder and operable to a release position to disconnect the control pipe from the brake cylinder and vent the latter. Fluid pressure motors are provided to maintain the valve means in release position provided the control pipe pressure exceeds a preselected value at the time the valve means is actuated to release position. In order to permit restoration of the valve means to normal position when the release valve device is employed in a brake equipment including a retaining valve adjusted to a high pressure setting, the device must be connected to not only the control pipe and a brake cylinder pipe but also to a third pipe (such as a branch of a brake pipe, or of a retainer pipe) which renders the brake equipment more complex.

The principal object of this invention is to provide an improved brake cylinder release valve device which is connected merely to the control pipe and brake cylinder and embodies a single piston connected to a valve means. This valve means is biased by a light spring to a normal position in which it connects the brake cylinder with the control pipe and effects equalization of fluid pressures across said piston, and is operable to a release position in which it disconnects the control pipe from the brake cylinder and vents the latter and creates a fluid pressure differential across said piston corresponding to the existing value of control pipe pressure. This improved release valve device also embodies a novel reset device which establishes a restricted communication permitting pressure fluid to flow from the control pipe to the brake cylinder in bypass of the valve means except when control pipe pressure exceeds brake cylinder pressure by at least a preselected degree, such as about 30 p.s.i., which is less than the control pipe pressure corresponding to a full service application of brakes (during which an auxiliary reservoir is maintained connected to the control pipe) and is greater than that corresponding to the high pressure setting of any retaining valve that may be used.

With this improved arrangement, if the valve means is actuated to release position while control pipe pressure exceeds a predetermined value, such as about 35 p.s.i., somewhat greater than said preselected degree for reasons hereinafter to be explained, said valve means will remain in release position until control pipe pressure is reduced below a predetermined lower value, such as about 5 p.s.i. corresponding to the bias effect of said spring and less than the brake cylinder pressure necessary to effect engagement of the brake shoes with the wheels, thereby to positively prevent such engagement if a retaining valve should be adjusted to its high pressure setting; and the reset device, by reestablishing the restricted communication as soon as control pipe pressure is reduced to within 30 p.s.i. of the then vented brake cylinder, will assure that control pipe pressure may be reduced to said predetermined lower value and thus cause said valve means to return to normal position and cut off the brake cylinder from atmosphere even if a retaining valve should be adjusted to its high pressure setting.

Other objects and advantages will become apparent from the following more detailed description of the invention and from the accompanying drawing wherein: FIGS. 1 and 2 are vertical axial section views of brake cylinder release valve devices constructed according to different embodiments of the invention, and FIG. 3 is a fragmentary sectional view of a release valve device identical with that shown in FIG. 2 except for substitution of a modified form of reset device. In each view, the release valve device is shown in a normal or non-releasing position.

Description—FIG. 1

The brake cylinder release valve device shown in this figure comprises a piston 1, preferably of the diaphragm-piston type, reciprocably mounted in a sectionalized casing and having at one side a chamber 2 open to atmosphere via a vent port 3 and having at the opposite side a lock-up chamber 4. Coaxially connected to the said opposite side of piston 1 is a valve assemblage comprising a cylindrical slide valve 5 and a double-seating, preferably disc-shaped, valve 6. Valve 5 is sealingly reciprocable in a bushing 7 pressed into a bore through a casing partition separating chamber 4 from an inlet chamber 8 that is connected to a brake control pipe 9. Valve 6 is contained in an outlet chamber 10 connected via a brake cylinder pipe 11 to a brake cylinder 12.

When pressure in chamber 4 is within a chosen degree, such as about 5 p.s.i., of the pressure in chamber 2, a helical spring 13 acting through piston 1 will bias the valve assemblage 5, 6 to a normal position, in which it is shown. In this position, an annular cavity 14 formed in the exterior of valve 5 and constantly open to chamber 2 via a valve passageway 15, registers with a plurality of radially arranged ports 16 and a restricted leak port 16a provided in bushing 7 and open to lock-up chamber 4 for venting the latter via chamber 2 and vent port 3; and an elongated annular cavity 17, which is also formed in said valve and constantly open to inlet chamber 8, is sealingly isolated by an O-ring seal 18 from said radial ports to cut off chamber 8 from chamber 4. Also, the lower side of valve 6 is seated against an annular valve seat rib 19, formed on a partition member 20, that sealingly separates chamber 10 from an atmospheric chamber 21 to cut off the brake cylinder 12 from vent ports 22 connecting the interior of said rib with chamber 21; and the upper side of valve 6 is unseated from an annular valve seat rib 23 that encircles a bore through a casing partition 24 separating chambers 8, 10, thereby permitting large capacity flow between said chambers 8, 10 because said bore is of substantially greater diameter than valve 5.

A reset valve 25, which may be of the piston-valve type, is reciprocable in a guide bushing pressed into a bore through partition 24 eccentrically of the axis of the valve assemblage 5, 6. Valve 25 is subject to control pipe pressure in chamber 8 acting in opposition to brake cylinder pressure in chamber 10 and a relatively strong helical spring 26 which biases said valve to a normal position, in which it is shown, unless control pipe pressure exceeds brake cylinder pressure by a preselected degree, such as about 30 p.s.i. Valve 25 carries an O-ring seal 27 that prevents leakage of pressure fluid along the valve bore, and also has an annular groove 28 constantly open to chamber 10. When valve 25 is in normal position, groove 28 registers with a plurality of radial ports 29 provided in the guide bushing and constantly exposed to chamber 8, said ports being of collective restricted flow capacity so as to permit control pipe pressure to bleed down at a restricted rate into chamber 10 if said valve remains in normal position or is moved thereto while the brake cylinder is vented.

The release valve device also comprises a pusher stem 30 that is slidably reciprocable in a central bore through partition member 20. A helical spring 31 in chamber 21 operatively biases stem 30 out of contact with valve 6 and into contact with a ported camming flange 33 for, in turn, biasing the latter to a normal position, in which it overlyingly contacts an annular support ledge 34 encircling the lower end of said chamber and is coaxially aligned with the stem. A yoke 35 coaxially connected to camming flange 33 is universally rockable to tilt said flange relative to ledge 34 and thereby shift stem 30 upward against resistance of spring 31 into coaxial contact with the lower end of the valve assemblage 5, 6 and, through such contact, move valve 6 toward seat rib 23.

Pressure of fluid in the control pipe 9 may be controlled by a brake controlling valve device 36 such as of the "AB" type disclosed in U.S. Patent 2,031,213. This valve device 36 comprises, briefly, a service or triple valve portion 37 comprising valve means (not shown) responsive to an increase in pressure of fluid in a brake pipe 38 to supply pressure fluid from the brake pipe to an auxiliary reservoir 39 and an emergency reservoir 40 and connect the control pipe 9 to a release or retaining pipe 41 in which may be interposed a retaining valve 42. Valve 42 may be of the well-known type operative to connect the retainer pipe directly to atmosphere or indirectly to atmosphere via one of the other of two spring-loaded check valves which serve respectively to retain 10 p.s.i. and 20 p.s.i. pressure in the retainer pipe and hence in the control pipe 9 when these pipes are interconnected by service portion 37. This service portion 37 responds to a reduction in brake pipe pressure to supply fluid from the auxiliary reservoir 39 to the control pipe 9 at a pressure corresponding to the extent of such reduction, it being noted that upon a full service reduction in brake pipe pressure, the auxiliary reservoir will be maintained connected to the control pipe. Device 36 also comprises an emergency portion 43 responsive to an emergency rate of reduction in brake pipe pressure to connect the emergency reservoir 40 to the control pipe 9.

*Operation—Fig. 1*

Assume initially that the valve assemblage 5, 6 and reset valve 25 and camming flange 33 are biased to their previously defined respective normal positions, in which they are shown, thereby defining a normal position of the brake cylinder release valve device.

As pressure fluid is successively supplied to and released from control pipe 9, spring 13 will operatively maintain valve 6 unseated from seat rib 23 because the chambers 2, 4 will remain concurrently vented; and hence brake cylinder pressure will vary with control pipe pressure, and reset valve 25 will be maintained in normal position by spring 26 because equal fluid pressures will always act on both ends of said reset valve with valve 6 unseated from rib 23.

Assume now that while the control pipe 9 and hence brake cylinder 12 are charged to above a predetermined value, such as about 35 p.s.i., yoke 35 is manually rocked to cause the camming flange 33 to shift pusher stem 30 upward and through contact with valve assemblage 6, 5 move the latter and piston 1 correspondingly upward. As the valve assemblage 5, 6 moves upward, seal 18 will be carried past bushing ports 16 to cut off lock-up chamber 4 from the vent passageway 15 except by way of leak port 16a and uncover cavity 17 and hence inlet chamber 8 to ports 16; whereupon control pipe pressure fluid will flow via said ports to chamber 4 and effectively build up in chamber 4 and shift piston 1 and the valve assemblage further upward against the relatively light bias of spring 13 to a release position, in which seal 18 is disposed above leak port 16a to complete the cut off of chamber 4 from vent passageway 15, and the control pipe is maintained connected to chamber 4 via cavity 17 and ports 16, and valve 6 is seated against seat rib 23 and unseated a maximum degree from rib 19. Thus, during a releasing operation, yoke 35 need not be rocked far enough to actually manually seat valve 6.

With valve assemblage 5, 6 in release position, the brake cylinder will be rapidly vented at a substantially unrestricted rate via the large capacity vent ports 22. Meanwhile, some control pipe pressure fluid will initially leak from chamber 8 to chamber 10 in bypass of valve 6 and at a restricted rate via the restricted ports 29 and groove 28 of reset valve 25; however, such leakage will be only temporary because, as soon as brake cylinder pressure (which is reducing at a substantially unrestricted rate via vent ports 22) has reduced the illustrative 30 p.s.i. (corresponding to the bias effect of spring 26) below control pipe pressure in chamber 8, reset valve 25 will be shifted against resistance of said spring to an abnormal or cut-off position, in which seal 27 is disposed below restricted ports 29 and hence sealingly isolates chamber 8 from chamber 10 and vent ports 22. Thus, with valve 6 seated against rib 23 and reset valve 25 in its abnormal position, pressure fluid will be bottled up in chamber 8 and control pipe 9 and lock-up chamber 4, for maintaining valve assemblage 5, 6 in release position and hence preventing blowdown of pressure in the control pipe and also in the emergency reservoir 40 and/or auxiliary reservoir 39 if said reservoirs are then connected to the control pipe by brake controlling valve device 36 responsively to an emergency or full service reduction, respectively, in brake pipe pressure.

When brake pipe pressure is increased, the brake controlling valve device 36 will connect the control pipe 9 to the retainer pipe 41 and permit control pipe pressure to initially reduce to at least 20 p.s.i. even if the retaining valve 42 is then adjusted to its high pressure setting. Since the brake cylinder 12 is vented, it will be apparent that as soon as pressure in control pipe 9 and hence in chambers 8 and 4 is reduced below the illustrative 30 p.s.i. corresponding to the bias effect of spring 26, reset valve 25 will be shifted to normal position and permit pressure in the control pipe and lock-up chamber 4 to blow down to amosphere via restricted ports 29, reset valve cavity 28 and vent ports 22 until lock-up chamber pressure is reduced to the illustrative 5 p.s.i.; whereupon spring 13 acting through piston 1 will operatively restore valve assemblage 5, 6 to its previously defined normal position, in which valve 6 is unseated from rib 23 and seated against rib 19, and lock-up chamber 4 is reconnected to vent port 3 via passageway 15. It will be noted that as valve assemblage 5, 6 moves downward toward normal position, seal 18 will ride past restricted leak port 16a and establish a restricted leak connection between chamber 4 and vent passageway 15 before said seal moves further downward and cuts off valve cavity 17 and hence inlet chamber 8 from ports 16. This crossover feature thus positively assures that pressure fluid cannot be trapped in chamber 4 and prevent return of the valve assemblage to normal position.

It will be noted that if the retaining valve 42 is not used or is adjusted to its direct release setting in which it connects the retainer pipe 41 directly to atmosphere, the control pipe 9 can be completely vented when it is connected to the retainer pipe via the brake controlling valve device 36 in release position. Hence, in such case the pressure in lock-up chamber 4 will blow down to the illustrative 5 p.s.i. at a substantially unrestricted rate primarily via the control pipe 9 and retainer pipe 41, rather than at a restricted rate via chamber 8, the reset valve 25 and then vented chamber 10.

Assume now that, while the pressure in control pipe 9 and brake cylinder 12 is less than about 30 p.s.i. and the control pipe is cut off from auxiliary reservoir 39 by the brake controlling valve device 36 in lap position, yoke 35 is rocked to operatively shift the valve assemblage 5, 6 to release position, in which as already explained valve 6 is unseated from rib 19 to vent the brake cylinder 12 and is seated against rib 23, and lock-up chamber 4 is cut off from vent passageway 15 and connected to the control pipe 9 via ports 16, 16a and cavity 17. Under this condition, the reset valve 25 will remain in normal position; and hence the valve assemblage 5, 6 will remain in release position temporarily until pressure in the control pipe 9 and chamber 4 has blown down via restricted ports 29 and reset valve cavity 28 and the then vented chamber 10 to the illustrative 5 p.s.i., whereupon spring 13 will operatively and automatically return the valve assemblage 5, 6 to normal position to reconnect the control pipe to the brake cylinder 12. The fluid at a pressure of about 5 p.s.i. then contained in chamber 8 and in the control pipe 9 (which is now lapped at device 36) will equalize into chamber 10 and the brake cylinder pipe 11 and clearly be insufficient to actuate the brake cylinder piston to brake applying position against the bias of its return spring (not shown). Thus brakes will remain released until brake pipe pressure is subsequently reduced to cause the device 36 to supply pressure fluid from auxiliary reservoir 39 to control pipe 9 for supply past valve 6 in normal position to the brake cylinder 12.

It will thus be seen that if the valve assemblage 5, 6 is shifted to release position while control pipe pressure exceeds a predetermined value, such as about 35 p.s.i., it will remain there because the brake cylinder 12 will be vented at a substantially unrestricted rate and cause control pipe pressure promptly to exceed brake cylinder pressure by the preselected degree, such as 30 p.s.i., necessary to shift reset valve 35 to abnormal position. This "predetermined value" must be somewhat higher than said "preselected degree" because some control pipe pressure fluid will be supplied to chamber 4 and also leak via restricted ports 29 into the then vented chamber 10 before movement of vent valve 25 to abnormal position, and this will cause some reduction in control pipe pressure especially if the control pipe is then cut off from the emergency reservoir 40 and/or auxiliary reservoir 39 by device 36. On the other hand, if the valve assemblage 5, 6 is moved to release position while control pipe pressure is less than said predetermined value, it will remain in release position only temporarily until, after the brake cylinder 12 is vented, control pipe pressure has blown down below a predetermined lower value, such as about 5 p.s.i., via restricted ports 29 and reset valve cavity 28 and the then vented chamber 10.

*Description and operation—FIG. 2*

To eleminate unnecessary redescription, those components of the brake cylinder release valve device shown in this figure which are identical with those shown in FIG. 1 are designated by like reference numerals and those components which are comparable but not strictly identical are designated by the same reference numerals but with a prime added as a suffix.

According to this embodiment, piston 1' is coaxially connected to a valve assemblage comprising two disc-shaped valves 50 and 51 selectively seatable against seat ribs 23' and 19', respectively, and a cylindrical slide valve 52 interposed between valves 50, 51 and sealingly reciprocable in a bushing 53 pressed into a bore through a casing partition separating outlet chamber 10' from a chamber 54 constantly connected to chamber 2' via a passage 55. Valve 50 is disposed in outlet chamber 10' and controls connection of said chamber with inlet chamber 8'; valve 51 is disposed in chamber 54 and controls connection of chamber 54 with atmospheric chamber 21'; and valve 52 comprises two axially spaced annular cavities 56, 57 interconnected by a valve passageway 58. Piston 1' is subject to the pressures of fluid and of a spring 13' in chamber 2' acting in opposition to pressure in inlet chamber 8'.

In operation, assume that the valve assemblage 50, 51, 52 is in normal position, in which it is shown in FIG. 2, and in which valve 50 is unseated, valve 51 is seated, and valve cavity 56 registers with lateral ports 59 in bushing 53 for connecting chambers 10' and 54. Under this condition, pressure fluid supplied to control pipe 9 will flow via inlet chamber 8' past unseated valve 50 to outlet chamber 10' whence it will flow via brake cylinder pipe 11 to the brake cylinder and will also flow via valve cavity 56, bushing port 59, chamber 54 and passage 55 to chamber 2'. Hence, fluid at substantially the same pressure will always be supplied to chambers 8' and 2' at opposite sides of piston 1', thereby enabling spring 13' to normally maintain the valve assemblage 50, 51, 52 in normal position.

When the yoke 35' is rocked, valve assemblage 50, 51, 52 will be operatively shifted upward for unseating valve 51 to vent chambers 54 and 2' and throttling flow of pressure fluid through ports 59 from the brake cylinder and control pipe to the now vented chamber 54, thereby creating an upwardly acting fluid pressure force on piston 1' which will effect or at least assist movement of the valve assemblage further upward to a release position. In release position, valve 50 is seated to cut off control pipe 9 from brake cylinder pipe 11, and slide valve cavity 57 registers with bushing ports 59 to permit brake cylinder pressure fluid to flow via pipe 11, and the cavity 56 and passageway 58 and cavity 57 of slide valve 52, to chamber 54 and thence to atmosphere past the now fully unseated valve 51.

The reset valve 25 in this embodiment will function in the same manner as already described in connection with FIG. 1. More specifically, if at the time the valve assemblage 50, 51, 52 was operatively shifted toward release position by yoke 35', control pipe pressure exceeded the predetermined value, the reset valve 25 will move to abnormal position after a temporary blowdown of control pipe pressure via restricted ports 29 and cause said valve assemblage to remain in release position until control pipe pressure is reduced; whereas if control pipe pressure was less than said predetermined value, the reset valve will remain in normal position and permit continuous blowdown of control pipe pressure via restricted ports 29 and the then vented chamber 10', thereby causing said valve assemblage automatically to be restored to normal position by spring 13' when control pipe pressure in chamber 8' is reduced to about 5 p.s.i.

*Description and operation—FIG. 3*

The brake cylinder release valve device according to this embodiment differs from that shown in FIG. 2 only in that a reset valve device 100 is substituted for the reset valve 25 of FIG. 2.

Reset valve device 100 comprises a piston 101 sealingly reciprocable in a bore of a bushing 102 press fit into a casing partition separating inlet chamber 8' from outlet chamber 10'. A reset valve, in the form of a check valve 103, is provided in chamber 10' and biased by a light spring 104 into contact with an annular valve seat rib encircling the lower end of a central opening 105 through piston 101; and flow of pressure fluid to the seating side of said check valve is restricted, such as by a restricted port or a choke fitting 106 in said opening. Spring 104 will permit unseating of check valve 103 when control pipe pressure exceeds brake cylinder pressure by about 3 p.s.i., or some other pressure lower than that at which spring 13' (FIG. 2) will restore the valve assemblage 50, 51, 52 to normal position. A heavier helical spring 107 in chamber 10' biases the piston 101 upward to a normal position in which a flange on said piston abuts the lower end of bushing 102.

In operation, when the valve assemblage 50, 51, 52 (FIG. 2) is in normal position, fluid at the same pressure will always be supplied to both ends of piston 101, permitting springs 107, 104 to maintain the piston in normal position and check valve 103 seated, as shown in FIG. 3. When the valve assemblage 50, 51, 52 is moved to release position, the brake cylinder will be vented at a rapid rate, and control pipe pressure will start to blow down at a restricted rate via choke 106 and check valve 103 into the then vented chamber 10'.

If, at the time the valve assemblage was moved to release position, control pipe pressure exceeded the predetermined value of 35 p.s.i., the piston 101 will be shifted against resistance of spring 107 to an abnormal position as soon as control pipe pressure exceeds the rapidly reducing brake cylinder pressure by a preselected degree, such as 30 p.s.i. In moving to abnormal position, piston 101 will carry check valve 103 downward and compress spring 104 solid, thereby preventing unseating of the check valve and cutting off further blowdown of control pipe pressure and causing the valve assemblage 50, 51, 52 to be maintained in release position by control pipe pressure trapped in chamber 8'. When control pipe pressure is reduced to below 30 p.s.i. by operation of the brake controlling valve device 36 (FIG. 1) to release position responsively to recharging of the brake pipe 38, piston 101 will be returned to normal position, and permit control pipe pressure fluid to blow down to below the illustrative 5 p.s.i. via the choke 106 and check valve 103 for causing valve assemblage 50, 51, 52 to be restored to normal position automatically by spring 13'.

If control pipe pressure is less than the predetermined value when the valve assemblage 50, 51, 52 is shifted to release position, the piston 101 will remain in normal position and permit control pipe pressure fluid to blow down to below the illustrative 5 p.s.i. via choke 106 and check valve 103 for causing the valve assemblage to be restored to normal position shortly after the brake cylinder is vented, and without requiring operation of the brake controlling valve device 36 to release position.

It is to be noted that, if preferred, the reset device 100 may be substituted for the reset valve 25 in the embodiment shown in FIG. 1; and that each of the embodiments of the improved brake cylinder release valve device may be interposed between a brake cylinder and a brake controlling valve device which need not be necessarily of the "AB" type but may, for example, be of the "AC" type disclosed in U.S. Patent 2,812,985 or the well-known "K" type.

Having now described the invention, what I claim as new and desire to secure by Letters Patent, is:

1. For interposition between a brake control pipe and a brake cylinder, a brake cylinder release valve device comprising, in combination, valve means having a normal position in which it connects the control pipe with the brake cylinder and a release position in which it disconnects the control pipe from the brake cylinder and connects the latter to a vent, bias means exerting on said valve means a relatively light bias toward normal position, means operable to move said valve means to release position, a double-acting fluid pressure motor operatively connected to said valve means, said valve means being effective in normal position to cause equalization of opposing fluid pressures acting on said motor to render said motor inert, and effective in release position to cause a differential fluid pressure corresponding substantially to the value of control pipe pressure to be established between said opposing fluid pressures to cause said motor to hold said valve means in release position against opposition of said bias means provided and so long as control pipe pressure is above a predetermined low value, means including a valve providing a restricted communication via which pressure fluid may flow at a restricted rate from the control pipe to the brake cylinder in bypass of said valve means, and means subject to control pipe pressure acting in opposition to brake cylinder pressure and a heavy bias pressure and biased by the latter to a normal position to permit flow via said valve through said communication and operative to an abnormal position to prevent such flow when control pipe pressure exceeds brake cylinder pressure by a preselected degree substantially greater than said predetermined low value, whereby if said valve means is operated to release position while control pipe pressure is less than a predetermined higher value, somewhat greater than said preselected degree, the last introduced means will remain in normal position and cause control pipe pressure to bleed down via said restricted communication and permit return of said valve means to normal position, and whereby if said valve means is operated to release position while control pipe pressure exceeds said predetermined higher value said last introduced means will operate to abnormal position to cause said valve means to be maintained in release position indefinitely until after said last introduced means is returned to normal position responsively to a reduction in control pipe pressure to within said preselected degree of brake cylinder pressure.

2. For interposition between a brake control pipe and brake cylinder, a brake cylinder release valve device comprising, in combination, valve means biased by a bias means to a normal position in which it connects the control pipe with the brake cylinder and manually operable to a release position in which it disconnects the control pipe from the brake cylinder and vents the latter, a fluid pressure motor operatively connected to said valve means and subject opposingly to pressures of fluid in two chambers, said valve means controlling two separate flow connections selectively established to cause both of said chambers to be connected to each other when said valve means is in normal position so as to render said motor inert and cause only one of said chambers to be connected to the control pipe and the other chamber to be vented when said valve means is in release position so as to cause said motor to maintain said valve means in release position provided and so long as control pipe pressure exceeds a predetermined low value corresponding to the force of the bias means, and means providing a restricted communication via which pressure fluid may flow from the control pipe to the brake cylinder at a restricted rate in bypass of said valve means, the last-introduced means including reset valve means controlled by control pipe pressure opposing brake cylinder pressure and a heavy bias pressure, said reset valve means being biased to a normal position for permitting flow through said communication and operative to an abnormal position for preventing such flow when control pipe pressure exceeds brake cylinder pressure by a preselected degree corresponding substantially to the heavy bias pressure and greater than said predetermined low value, whereby when the first-mentioned valve means is operated to release position it will remain there or be returned to normal position according to whether or not control pipe pressure exceeds a predetermined higher value sufficient to cause operation of said reset valve means to abnormal position.

3. For interposition between a brake control pipe and brake cylinder, a brake cylinder release valve device comprising, in combination, valve means biased by a bias means to a normal position in which it connects the control pipe with the brake cylinder and manually operable to a release position in which it disconnects the control pipe from the brake cylinder and vents the latter, a fluid pressure motor operatively connected to said valve means and subject opposingly to pressures of fluid in two chambers, said valve means being effective in normal position to cause equalization of fluid pressures in said chambers to render said motor inert and effective in release position to cause a differential fluid pressure to be established between said chambers capable of causing said motor to maintain said valve means in release position provided and so long as control pipe pressure exceeds a predetermined low value corresponding to the force of the bias means, and means providing a restricted communication via which pressure fluid may flow from the control pipe to the brake cylinder at a restricted rate in bypass of said valve means, the last-introduced means including reset means controlled by control pipe pressure opposing brake cylinder pressure and a heavy bias pressure, said reset means being biased to a normal position for permitting flow through said communication and operative to an abnormal position for preventing such flow when control pipe pressure exceeds brake cylinder pressure by a preselected degree corresponding substantially to the heavy bias pressure and greater than said predetermined low value, whereby when the first-mentioned valve means is operated to release position it will remain there or be returned to normal position according to whether or not control pipe pressure exceeds a predetermined higher value greater than said preselected degree and sufficient to cause operation of said reset means to abnormal position.

4. A brake cylinder release valve device according to claim 3, wherein one of said chambers is always vented, and said valve means in normal position connects the other of said chambers to a vent and in release position cuts off said other chamber from the vent and connects said other chamber to the control pipe.

5. A brake cylinder release valve device according to claim 3, wherein said valve means in normal position connects one of said chambers to the control pipe and in release position disestablishes such connection and connects said one chamber to a vent, and wherein the other of said chambers is always connected to the control pipe.

6. A brake cylinder release valve device according to claim 3, wherein said restricted communication permits pressure fluid to flow in both directions between the control pipe and brake cylinder, and said restricted communication is opened by said reset means in normal position and closed by said reset means in abnormal position.

7. A brake cylinder release valve device according to claim 3, wherein said restricted communication includes a check valve preventing flow of pressure fluid through such communication from the brake cylinder to the control pipe, and said reset means comprises a piston means subject to control pipe pressure acting in opposition to brake cylinder pressure and said heavy bias pressure and providing a seat for said check valve and ineffective or effective to hold said check valve against its seat according to whether control pipe pressure does not or does exceed brake cylinder pressure by said preselected degree.

8. For interposition between a brake control pipe and a brake cylinder, a brake cylinder release valve device comprising, in combination, valve means having a normal position in which it connects the brake cylinder with the control pipe and a release position in which it disconnects the control pipe from the brake cylinder and connects the latter to a vent, bias means exerting on said valve means a relatively light bias toward normal position, means manually operable for operating said valve means to release position against opposition of said bias means, said valve means being controlled by two opposing fluid pressures and controlling separate flow connections selectively established by said valve means to effect equalization of such opposing fluid pressures when said valve means is in normal position and cause a differential corresponding to the existing value of control pipe pressure to be developed in said opposing fluid pressures by said valve means in release position which differential acts in a direction to oppose action of said bias means and maintain said valve means in release position provided and so long as control pipe pressure exceeds a predetermined low value, means defining a restricted communication through which pressure fluid may flow at a restricted rate from the control pipe to the brake cylinder in bypass of said valve means, and reset valve means interposed in and forming part of said communication and having a normal position for permitting flow through said communication and an abnormal position for preventing such flow, said reset valve means being subject to control pipe pressure acting in opposition to brake cylinder pressure and pressure of a heavier bias means and biased to normal position except when control pipe pressure exceeds brake cylinder pressure by a preselected degree substantially greater than said predetermined low value, whereby the first-mentioned valve means upon being operated to release position will remain in release position temporarily if control pipe pressure is not high enough to cause operation of said reset valve means to abnormal position and will remain in release position indefinitely until control pipe pressure is reduced via the control pipe to within said preselected degree of brake cylinder pressure if control pipe pressure was high enough to cause operation of said reset valve means to abnormal position.

9. For interposition between a brake control pipe and a brake cylinder, a brake cylinder release valve device comprising in combination, a fluid pressure motor subject opposingly to atmospheric pressure and to pressure of fluid in a chamber, valve means biased to a normal position in which it connects the brake cylinder with the control pipe and vents said chamber and operable to a release position in which it cuts off the control pipe from the brake cylinder and vents the latter and connects said chamber to the control pipe, said motor being operatively connected to said valve means and being rendered inert when said chamber is vented and being effective to maintain said valve means in release position when and so long as said chamber is charged from the control pipe to above a predetermined low pressure, and means including reset valve means defining a restricted communication via which pressure fluid may flow at a restricted rate from the control pipe to the brake cylinder in bypass of the first-mentioned valve means, said reset valve means being controlled by control pipe pressure acting in opposition to brake cylinder pressure and a heavy bias pressure and biased by said bias pressure to a normal position for permitting flow through said communication and operative to an abnormal position for preventing such flow when control pipe pressure exceeds brake cylinder pressure by a preselected degree greater than said predetermined low pressure, whereby when said first-mentioned valve means is operated to release position it will remain there or be returned to normal position according to whether or not control pipe pressure exceeds a predetermined higher pressure sufficient to cause operation of said reset valve means to abnormal position.

10. For interposition between a brake control pipe and a brake cylinder, a brake cylinder release valve device comprising, in combination, a fluid pressure motor subject opposingly to control pipe pressure and to pressure of fluid in a chamber, valve means biased to a normal position in which it connects the brake cylinder with the control pipe and connects said chamber with control pipe and operable to a release position in which it cuts off the control pipe from the brake cylinder and vents the latter and cuts off said chamber from the control pipe and connects said chamber to atmosphere, said motor being operatively connected to said valve means and being rendered inert when said chamber is connected to the control pipe and thus causes equalization of opposing fluid pressure forces across said motor, said motor being effective to maintain said valve means in release position when with said chamber vented the control pipe is charged to above a predetermined low pressure, and means including reset valve means defining a restricted communication via which pressure fluid may flow at a restricted rate from the control pipe to the brake cylinder in bypass of first-mentioned valve means, said reset valve means being controlled by control pipe pressure acting in opposition to brake cylinder pressure and a heavy bias pressure and biased by said bias pressure to a normal position for permitting flow through said communication and operative to an abnormal position for preventing such flow when control pipe pressure exceeds brake cylinder pressure by a preselected degree greater than said predetermined low pressure, whereby when said first-mentioned valve means is operated to release position it will remain there or be returned to normal position according to whether or not control pipe pressure exceeds a predetermined higher pressure sufficient to cause operation of said reset valve means to abnormal position.

References Cited in the file of this patent

UNITED STATES PATENTS

| | | |
|---|---|---|
| 2,392,185 | Pickert | Jan. 1, 1946 |
| 2,508,206 | Whitney | May 16, 1950 |
| 2,650,139 | Klein | Aug. 25, 1953 |
| 2,725,261 | Pickert et al. | Nov. 25, 1955 |